(12) United States Patent
Seo (10) Patent No.: US 7,831,763 B2
(45) Date of Patent: Nov. 9, 2010

(54) SECURITY APPARATUS AND METHOD FOR NONVOLATILE MEMORY AND SYSTEM THEREOF

(75) Inventor: Kyung-Duck Seo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 601 days.

(21) Appl. No.: 11/828,627

(22) Filed: Jul. 26, 2007

(65) Prior Publication Data

US 2008/0142580 A1   Jun. 19, 2008

(30) Foreign Application Priority Data

Dec. 19, 2006   (KR) .................... 10-2006-0130439

(51) Int. Cl.
*G06F 12/00* (2006.01)
(52) U.S. Cl. ..................................... 711/103
(58) Field of Classification Search ................ None
See application file for complete search history.

(56) References Cited

U.S. PATENT DOCUMENTS 7,103,684 B2 * 9/2006 Chen et al. .................... 710/62

| | | | |
|---|---|---|---|
| 7,392,404 B2 * | 6/2008 | Montgomery et al. | 713/194 |
| 2004/0123132 A1 * | 6/2004 | Montgomery et al. | 713/200 |

FOREIGN PATENT DOCUMENTS

| JP | 08-110937 | 4/1996 |
|---|---|---|
| JP | 2002-269523 | 9/2002 |
| JP | 2003-263618 | 9/2003 |
| KR | 1996-0702651 | 4/1996 |
| KR | 1020040087794 A | 10/2004 |

* cited by examiner

*Primary Examiner*—Brian R Peugh
(74) *Attorney, Agent, or Firm*—F. Chau & Associates, LLC (57) ABSTRACT

A security apparatus for a nonvolatile memory includes a nonvolatile memory, a working buffer temporality storing a predetermined unit output from the nonvolatile memory, a checksum buffer storing a checksum of at least one unit output from the nonvolatile memory, and a read verification engine controlling storing of a unit output from the nonvolatile memory corresponding to a read signal that is externally input, in the working buffer. The read verification engine calculates a checksum of the unit corresponding to the read signal stored in the working buffer and compares a calculated checksum with a checksum of the unit corresponding to the read signal stored in the checksum buffer.

19 Claims, 7 Drawing Sheets

Control Register

| .7 | .6 | .5 | .4 | .3 | .2 | .1 | .0 |
|---|---|---|---|---|---|---|---|

[0] NVM Read Verification Control Bit
0 : NVM Read Verification enable
1 : NVM Read Verification disable

[1] NVM Checksum Correlation Control Bit
0 : Correlation complete
1 : Start correlation

[2] Not used

[3] Read Verification Monitor Bit
0 : No error detected
1 : Error detected

[4] Error Handling Control Bit
0 : Reset a chip
1 : Exception

[5-7] Not used

SECURITY APPARATUS AND METHOD FOR NONVOLATILE MEMORY AND SYSTEM THEREOF

CROSS-REFERENCE TO RELATED PATENT APPLICATION

This application claims priority under 35 U.S.C. §119 from Korean Patent Application No. 10-2006-0130439 filed on Dec. 19, 2006, the disclosure of which is hereby incorporated by reference herein as if set forth in its entirety.

BACKGROUND OF THE INVENTION

1. Technical Field

The present disclosure relates to a nonvolatile memory device and, more particularly, to a security apparatus and method for the nonvolatile memory device.

2. Discussion of Related Art

Nonvolatile memory devices include a mask ROM (read only memory), an EEPROM (electrically erasable and programmable ROM), an EPROM (erasable and programmable ROM), and so forth. The EEPROM that is electrically erasable or programmable has been increasingly used for system programming that requires continuous updating or as an auxiliary memory device.

More specifically, a flash EEPROM, hereinafter referred to as a flash memory device, having a higher integrity than a conventional EEPROM is very useful as a high-capacity auxiliary memory device. The flash memory device includes a NAND type, a NOR type, and an AND type. The NAND type flash memory device has a high integrity and is widely used as a data storage medium. The NOR type flash memory device has a fast data access speed and is widely used as a program code storage medium.

The nonvolatile memory device is widely used in a system demanding security and a predetermined storage device like a smart card. The system demanding security, however, is sometimes attacked by a hacker and yields confidential data. Thus, a demand for protecting the nonvolatile memory system is increasing.

The attacker obtains the data using an illegal method by analyzing the effect on a system, for example, a change in the output of the system, when a predetermined bit of data bits transmitted through a data transfer path of the system, for example, a data bus, is arbitrarily changed. To protect the nonvolatile memory from attack, conventionally, a method of repeatedly reading data and determining whether the read data is identical is used. Also, when the data is repeatedly read, the data is read through a random delay, so that the attack can be protected.

The conventional method, however, needs a plurality of data read operations and data comparisons. In addition, it is difficult to realize an ideally random delay and, to irregularly read a plurality of data, the performance of the system is deteriorated and the size of a system code such as firmware increases, which is inefficient.

Thus, a security apparatus and method is needed that can prevent the deterioration of performance due to utilizing a software protection method, that can realize an automatic protection mechanism in hardware, and that can improve the security performance of a system or chip, as well as the overall performance of the system.

SUMMARY OF THE INVENTION

To solve the above and/or other problems, exemplary embodiments of the present invention provide a security apparatus and method that can realize an automatic software protection mechanism in hardware to improve the security performance of a system or chip, as well as the overall performance of the system.

According to an exemplary embodiment of the present invention, a security apparatus for a nonvolatile memory comprises a nonvolatile memory, a working buffer temporality storing a predetermined unit output from the nonvolatile memory, a checksum buffer storing a checksum of at least one unit output from the nonvolatile memory, and a read verification engine controlling the storing in the working buffer of a unit output from the nonvolatile memory corresponding to a read signal that is externally input, wherein the read verification engine calculates a checksum of the unit corresponding to the read signal stored in the working buffer and compares a calculated checksum with a checksum of the unit corresponding to the read signal stored in the checksum buffer.

The checksum may comprise at least one of CRC data (cyclic redundancy checking) or parity data. At least one of the working buffer or the checksum buffer may comprise at least one of an SRAM (static random access memory) or a nonvolatile memory. The unit may be a page.

The read verification engine may output an error handling signal when the calculated checksum is different from the checksum of a unit corresponding to the read signal stored in the checksum buffer. The error handling signal may comprise at least one of an exception generation signal or a reset signal. The security apparatus may further comprise a control register, wherein the control register comprises at least one of a read verification engine control bit, a checksum control bit, a monitor bit, or an error handling bit.

The read verification engine may output an error handling signal based on information about the error handling bit of the control register when the calculated checksum is different from the checksum of a unit corresponding to the read signal stored in the checksum buffer. The security apparatus may further comprise a registers wherein the read verification engine calculates the checksum of the unit corresponding to the read signal stored in the working buffer and outputs data corresponding to the read signal to the register when the calculated checksum is the same as the checksum of the unit corresponding to the read signal stored in the checksum buffer.

The read verification engine may further compare data stored in the register with data corresponding to the read signal stored in the working buffer. In response to a high-voltage activation signal that is externally input, the read verification engine may transmit a unit corresponding to the high-voltage activation signal output from the nonvolatile memory, in the working buffer, calculate a checksum of a unit transmitted to the working buffer, and store a calculated checksum in the checksum buffer.

According to an exemplary embodiment of the present invention, a nonvolatile memory system comprises a controller, and any of the above security apparatuses for a nonvolatile memory, wherein, in response to a read signal output from the controller, the security apparatus controls storing of a unit output from a nonvolatile memory corresponding to the read signal in a working buffer, calculates a checksum of the unit corresponding to the read signal stored in the working buffer, and compares a calculated checksum with a checksum of the unit corresponding to the read signal stored in the checksum buffer. The nonvolatile memory system may comprise a smart card or a memory card.

According to an exemplary embodiment of the present invention a security method for a nonvolatile memory comprises storing a unit corresponding to a read signal that is externally input and output from a nonvolatile memory in a working buffer, calculating a checksum of the unit stored in the working buffer, and comparing a calculated checksum with a checksum of the unit corresponding to the read signal stored in a checksum buffer.

The security method may further comprise outputting an error handling signal when the calculated checksum is different from the checksum of the unit corresponding to the read signal stored in the checksum buffer. The security method may also comprise calculating checksums of alt units of the nonvolatile memory, and storing the calculated checksums in the checksum buffers before comparing the calculated checksum with the checksum of the unit corresponding to the read signal stored in a checksum buffer.

The security method may further comprise transmitting data corresponding to the read signal stored in the working buffer to a register, and comparing data stored in the register with data corresponding to the read signal stored in the working buffer, when the calculated checksum is the same as the checksum of the unit corresponding to the read signal stored in the checksum buffer.

In the outputting of the error handling signal an error handling signal may be output based on information about an error handling bit of a control register when the calculated checksum is different from the checksum of the unit corresponding to the read signal stored in the checksum buffer.

The security method may also comprise, in response to a high-voltage activation signal that is externally input, transmitting a unit corresponding to the high-voltage activation signal output from the nonvolatile memory to the working buffer, calculating a checksum of the unit transmitted to the working buffer, and storing a calculated checksum in the checksum buffer.

Also, in accordance with exemplary embodiments of the present invention, when a constituent element transmits data to another constituent element, it can be interpreted that the constituent element transmits the data to another constituent element directly or via at least one another constituent element. On the other hand, when a constituent element directly transmits data to another constituent element, it can be interpreted that the constituent element transmits the data to another constituent element directly without intervention of any other constituent elements.

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Figure 1:
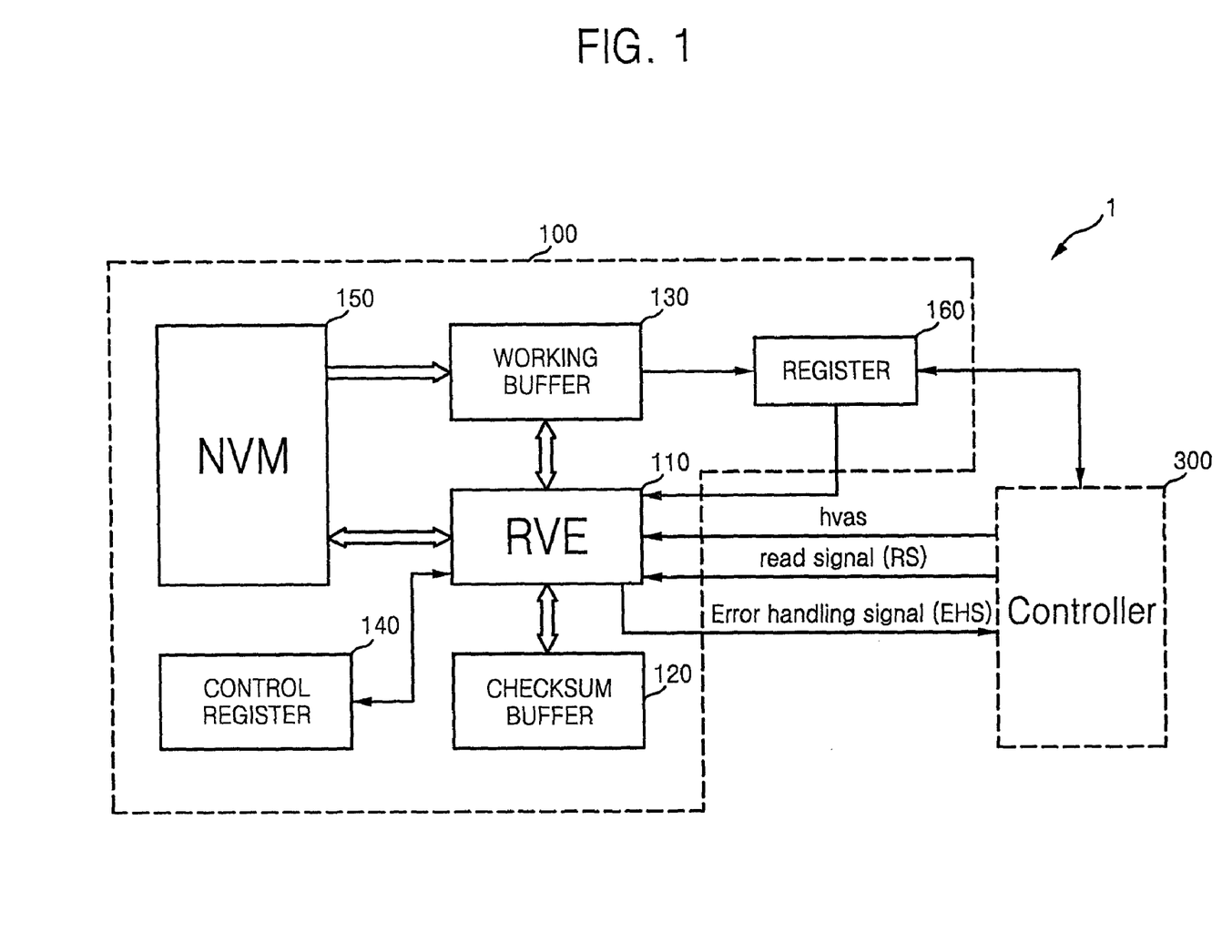
FIG. 1 is a block diagram of a security apparatus for a nonvolatile memory according to an exemplary embodiment of the present invention.

FIG. 1 is a block diagram of a security apparatus for a nonvolatile memory according to an exemplary embodiment of the present invention and a nonvolatile memory system having the security apparatus. Referring to FIG. 1, a nonvolatile memory system 1 includes a nonvolatile memory security apparatus 100 and a controller 300.

The nonvolatile memory security apparatus 100 includes a nonvolatile memory 150, a read verification engine (RVE) 1110, a checksum buffer 120, and a working buffer 130. The nonvolatile memory security apparatus 100 may further include a control register 140 and/or a register 160. The nonvolatile memory 150 can be embodied by an EEPROM (electrically erasable and programmable read only memory) or a flash EEPROM. Exemplary embodiments of the present invention are not limited thereto, however, and any nonvolatile memory capable of storing data demanding security is sufficient.

The working buffer 130 temporarily stores a predetermined unit of the nonvolatile memory 150. The predetermined unit may be a page unit. For examples when the data stored in the nonvolatile memory 150 is read from outside of the nonvolatile memory security apparatus 100, the working buffer 130 can store a page of the nonvolatile memory 150 including the data to be read.

Because the data read operation is mainly performed on a page by page basis, the unit including the data to be read itself can be stored. The predetermined units of the nonvolatile memory 150, however, need not be a page unit and can vary according to the specification of a system having the nonvolatile memory security apparatus 100 or a unit at which the system reads the data stored in the nonvolatile memory 150. Exemplary embodiments of the present invention will focus on a case of the unit being a page, but the scope of the present invention is not limited thereto.

The checksum buffer 120 stores a checksum of at least one unit, for example, a page, of the nonvolatile memory 150. That is, the checksum buffer 120 can store the checksum of all of the pages or a part of the pages of the nonvolatile memory 150. There may be some pages that are not actually read from the nonvolatile memory 150 according to exemplary embodiments. The pages that are not actually read need not be stored. When data is actually read, the checksum buffer 120 can store reference checksums to be compared with a checksum of the read page. Thus, a checksum of at least one page of the nonvolatile memory 150 can be stored in the checksum buffer 120 in advance.

The RVE 110 controls storing in the working buffer 130 of a page of the nonvolatile memory 150 corresponding to a read signal (RS) that is externally input. The RS includes an address signal, for example, a wordline signal, of data to be read. When the address signal is not included in the RS, the RVE 110 may further receive the address signal from the controller 300 in addition to the RS. Thus, the RVE 110 in response to the RS or the address signal can control the storing of the page of the nonvolatile memory 150 corresponding to the RS or the address signal in the working buffer 130.

Also, the RVE 110 can calculate the checksum of the page corresponding to the RS stored in the working buffer 130 and compare the calculated checksum with a checksum of a unit corresponding to the RS stored in the checksum buffer 120. For example, when the RVE 110 receives the RS to read data included in the n-th page of the nonvolatile memory 150, the RVE 110 stores the n-th page in the working buffer 130, calculates a checksum of the n-th page stored in the working buffer 130, and compares the calculated checksum with the checksum of the n-th page previously stored in the checksum buffer 120. As a result, it can be determined whether data is changed by a hacker's attack in a process of transmitting the data from the nonvolatile memory 150 to the working buffer 130.

Figure 3:
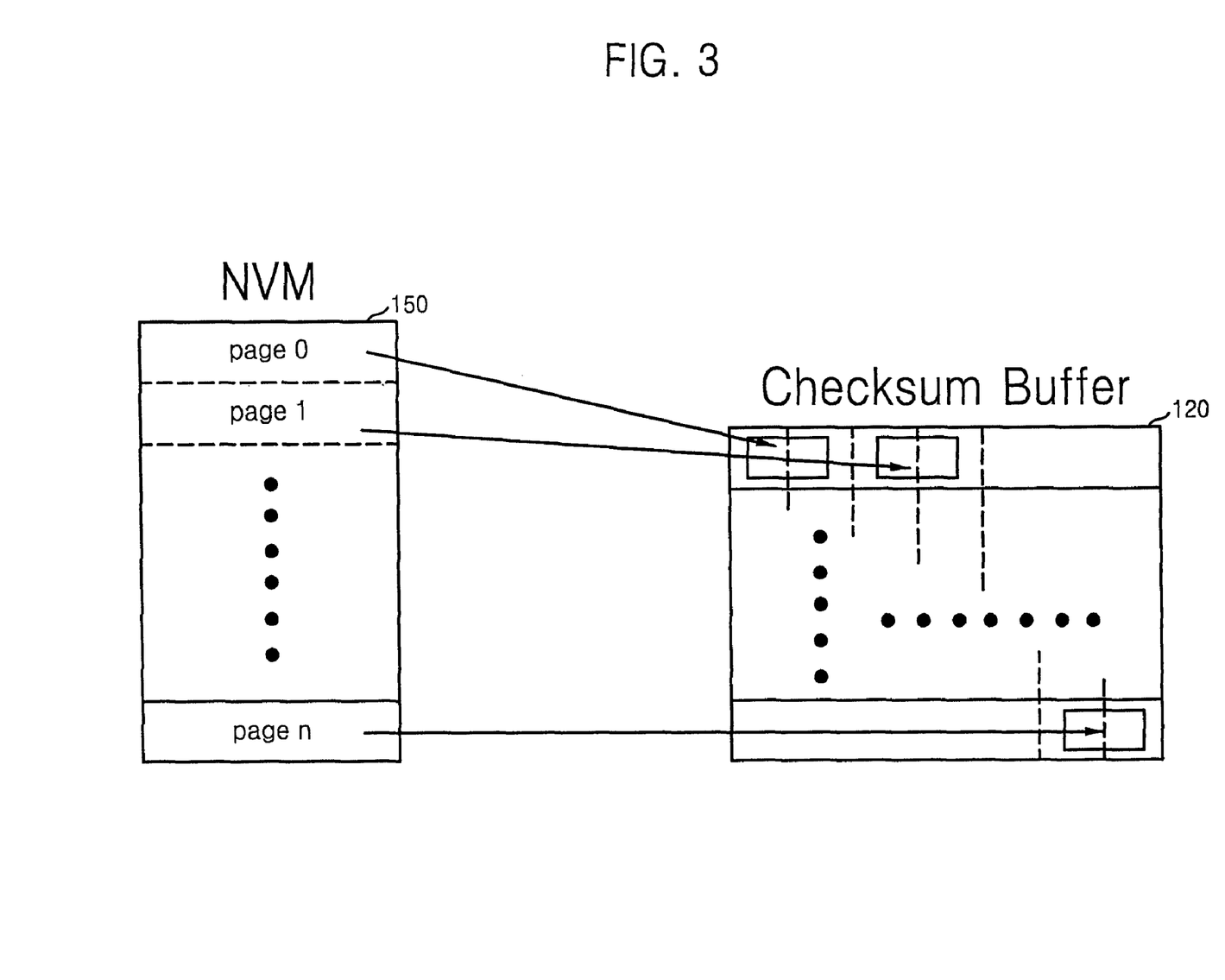
FIG. 3 schematically illustrates the concept of a checksum buffer according to an exemplary embodiment of the present invention.

Thus, the checksum of at least one page of the nonvolatile memory 150 is calculated and stored in the checksum buffer 120 in advance. FIG. 3 schematically illustrates the concept of a checksum buffer according to an exemplary embodiment of the present invention.

Referring to FIG. 3, the nonvolatile memory 150 can include an n number of pages, where n is a natural number not less than 1. When the checksum buffer 120 stores all checksums of the n number of pages, the checksum buffer 120 can store the checksum of each of the n number of pages (page 0-page n). Also, when the checksum is CRC (cyclic redundancy checking) 16 bits, each of the checksums may be two bytes of data.

The checksum of each page can be stored at a preset position in the checksum buffer 120. For example, the checksum of page 0 is stored at the first two bytes of the checksum buffer 120 while the checksum of page 1 is stored at the second two bytes of the checksum buffer 120. When the position where the checksum of each page is stored is preset and the RVE 110 compares the stored checksum with the checksum of a page stored in the working buffer 130, the comparison can be made with only a one-time reference to a given address, so that a fast comparison is possible.

The checksum can include at least one of CRC data and parity data. That is, the checksum may be data that can determine whether not only the CRC or the parity but also whether the data stored in the page of the nonvolatile memory 150 has an error or has been changed.

At least one of the working buffer 130 or the checksum buffer 120 can be embodied by an SRAM (static random access memory) or a nonvolatile memory. That is, the working buffer 130 or the checksum buffer 120 can be embodied by a volatile memory or a nonvolatile memory. When the checksum buffer 120 is embodied by a nonvolatile memory, it is advantageous that the stored checksums can be maintained as they are, even when the nonvolatile memory security apparatus 100 is powered off.

The RVE 110 outputs an error handling signal (EHS) to the controller 300 when the calculated checksum, that is, the checksum obtained by calculating the page stored in the working buffer 130, is different from checksum of the unit corresponding to the RS stored in the checksum buffer 120.

The EHS can include at least one of an exception generation signal or a reset signal. The output destination of the EHS may vary according to the nonvolatile memory system 1 having the nonvolatile memory security apparatus 100. For example, when the nonvolatile memory system 1 is a smart card or a memory card, the EHS can be output to the controller (or CPU) 300 of the smart card or the memory card.

When the exception generation signal is output to the controller 300, the controller 300 can execute a predetermined exception routine. When the reset signal is output to the controller 300, the controller 300 resets the nonvolatile security apparatus 100 or a chip having the nonvolatile security apparatus 100 so that a hackers attack can be protected against.

The exception routine or the apparatuses that are reset when resetting can be various according to the exemplary embodiments. Also, the nonvolatile memory security apparatus 100 may further include the control register 140.

Figure 2:
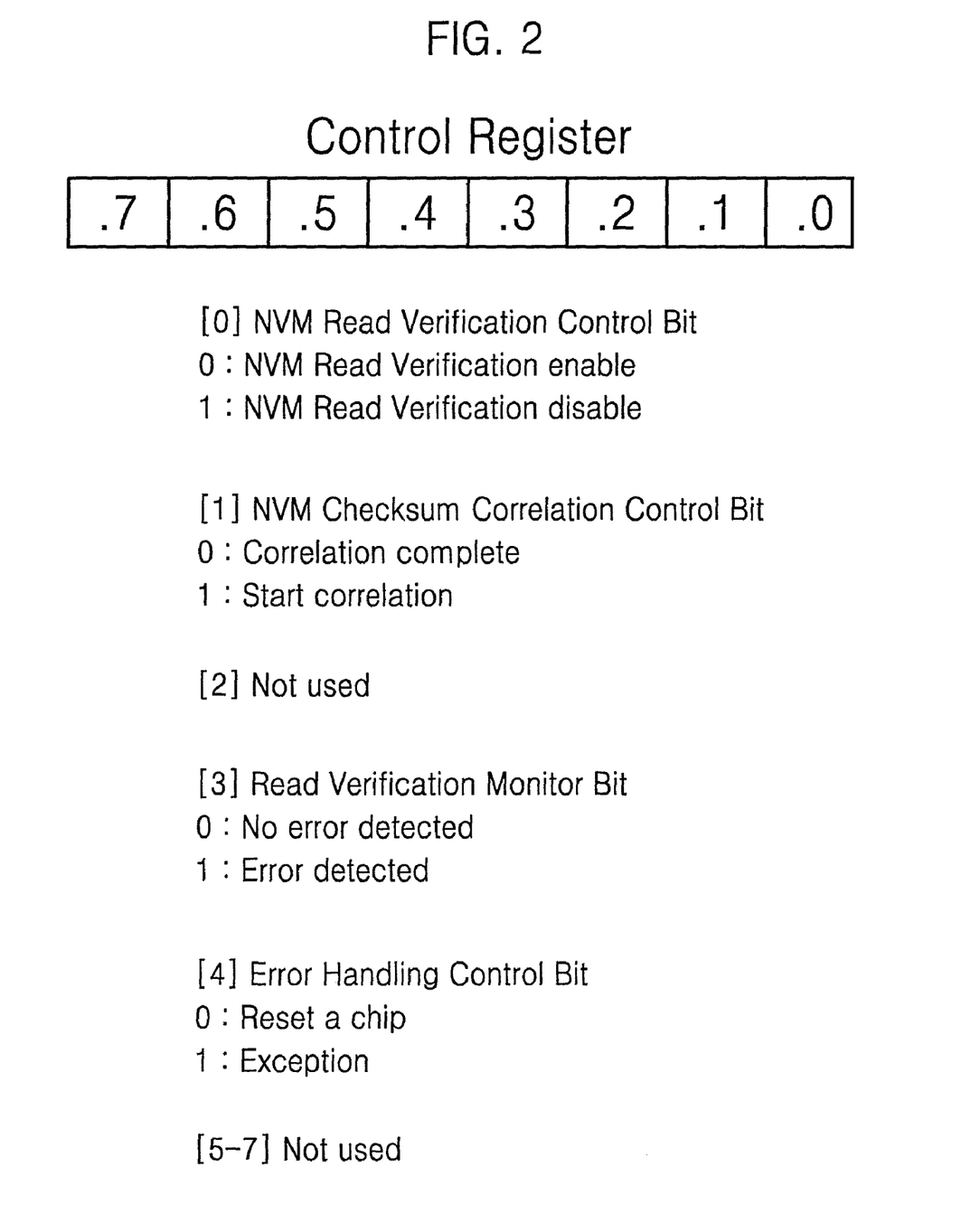
FIG. 2 schematically illustrates the concept of a control register according to an exemplary embodiment of the present invention.

FIG. 2 schematically illustrates the concept of a control register according to an exemplary embodiment of the present invention. Referring to FIGS. 1 and 2 the control register 140 includes at least one of an RVE control bit, a checksum control bit, a monitor bit, and an error handling bit.

The RVE control bit [0] can enable or disable the RVE 110 according to the logic level of the RVE control bit [0]. That is, when a security function is not needed, the RVE control bit [0] is set to a predetermined logic level, for example, "1", to disable the RVE 110. When the security function is needed, the RVE control bit [0] is set to a predetermined logic level, for example, "0", to enable the RVE 110. That is, by selectively enabling the RVE 110 the performance of the nonvolatile memory system 1 can be efficiently controlled.

The checksum control bit [1] is used to control the RVE 110 to calculate the checksums stored in the checksum buffer 120. That is, the calculation of checksum of at least one page of the nonvolatile memory 150 can be started according to the logic level of the checksum control bit [1]. When the calculation is complete, the logic level of the checksum control bit [1] can be changed. The calculated checksum can be stored in the checksum buffer 120.

Control bit [2] is not used in this exemplary embodiment.

The monitor bit [3] monitors whether an exception is generated in the nonvolatile memory security apparatus 100 when the exception is generated in the nonvolatile memory system 1. That is, in the nonvolatile memory system 1, the exception can be generated in a portion other than the nonvolatile memory security apparatus 100. Thus, when the exception is generated in the nonvolatile memory security apparatus 100, the monitor bit [3] is set to a predetermined logic level, for example, "1", so that the nonvolatile memory system 1 can recognize that the exception is generated in the nonvolatile memory security apparatus 100.

The error handling bit [4] is used to selectively output the reset signal or the exception generation signal from the RVE 110 when an EHS is generated in the nonvolatile memory security apparatus 100

Control bits [5-7] are not used in this exemplary embodiment.

In FIG. 2, the control register 140 is described as being embodied by a 8-bit register. The capacity of the register, the order of each bit, and the use of each bit, however, can vary according to the exemplary embodiments. Also, the value stored in the control register 140 can be set by a user through the controller 300 of the nonvolatile memory system 1 or it can be automatically changed in the nonvolatile memory system 1.

Thus, when the checksum of a page calculated by the RVE 110 and stored in the working buffer 130 is different from the checksum of a page corresponding to the RS stored in the checksum buffer 120, the RVE 110 outputs the EHS based on the error handling bit information of the control register 140. As noted, the nonvolatile memory security apparatus 100 can further include the register 160, and the register 160 can temporarily store the data read from the nonvolatile memory 150.

The RVE 110 calculates the checksum of a page corresponding to the RS stored in the working buffer 130. When the calculated checksum is the same as the checksum of the page corresponding to the RS stored in the checksum buffer 120, the RVE 110 provides control so that the data corresponding to the RS is transmitted to the register 160.

More specifically, when the page corresponding to the RS transmitted from the nonvolatile memory 150 to the working buffer 130 is not attacked, that is, the data stored in the nonvolatile memory 150 and the data stored in the working buffer 130 are identical, the data actually corresponding to the RS in the page stored in the working buffer 130 is transmitted to the register 160.

Also, because the data transmitted from the working buffer 130 to the register 160 can be attacked, the RVE 110 can further compare the data stored in the register 160 with the data corresponding to the RS stored in the working buffer 130. When the data are the same, according to the result of the comparison, the data transmitted to the register 160 can be normally transmitted outside of the nonvolatile memory security apparatus 100, for example, to the controller 300.

When the two data are different from each other, the RVE 110 outputs an exception generation signal or a reset signal. Also, the RVE 110 may refer to the error handling bit [4], see FIG. 2, of the control register 140 in order to selectively output the exception generation signal or the reset signal.

Also, the error handling bit [4] of FIG. 2 can be referred to when an error is generated by comparing the checksum of a page stored in the working buffer 130 with the checksum stored in the checksum buffer 120. Thus, when an error is generated by comparing the data stored in the working buffer 130 with the data stored in the register 160, by referring to an additional control bit (not shown) in addition to the control register 140, the RVE 110 can selectively output the exception generation signal or the reset signal.

Thus, the control register 140 may further include the additional control bit (not shown). In this case, when an error is generated by comparing the checksum of a page stored in the working buffer 130 with the checksum stored in the checksum buffer 120, and the data stored in the working buffer 130 with the data stored in the register 160, the EHS's that are output from the RVE 110 can be different from each other.

Also, in response to a high voltage activation signal (hvas) that is externally input, for example, from the controller 300, the RVE 110 transmits a page of the nonvolatile memory corresponding to the hvas to the working buffer 130, calculates the checksum of the page transmitted to the working buffer 130, and stores the calculated checksum in the checksum buffer 130.

The hvas may include an address signal corresponding to the page of the nonvolatile memory 150 to be updated. When the address signal is not included in the hvas, the RVE 110 can receive the hvas and additionally receive the address signal. Thus, the RVE 110 transmits the page of the nonvolatile memory 150 to be updated to the working buffer 130 based on the address signal or the hvas, calculates the checksum of the page transmitted to the working buffer 130, and stores the calculated checksum in the checksum buffer 120. As a result, the checksum buffer 120 can store the updated checksum whenever the nonvolatile memory 140 is updated.

As described above, the nonvolatile memory system 1 according to an exemplary embodiment of the present invention can include the nonvolatile memory security apparatus 100 and the controller 300. The controller 300 can be diversely embodied, for example, by a CPU or a processor of an embedded system, according to the kind of nonvolatile memory system 1. That is, when the nonvolatile memory system 1 is a smart card, the controller 300 can be a processor such as a CPU of the smart card. When the nonvolatile memory system 1 is a memory card, the controller 300 can be a controller of the memory card.

In response to the RS output from the controller 300 the nonvolatile memory security apparatus 100 stores the page of the nonvolatile memory 10 corresponding to the RS in the working buffer 130, calculates the checksum of the page corresponding to the RS stored in the working buffer 130, and compares the calculated checksum with the checksum of the page corresponding to the RS stored in the checksum buffer 120.

Also, the hvas can be output from the controller 300 to the nonvolatile memory security apparatus 100. The EHS can be output from the nonvolatile memory security apparatus 100 to the controller 300. The nonvolatile memory system 1 can be embodied by a smart card or a memory card, however, the present invention is not limited thereto and the nonvolatile memory system 1 can be embodied in a variety of structures.

Figure 6:
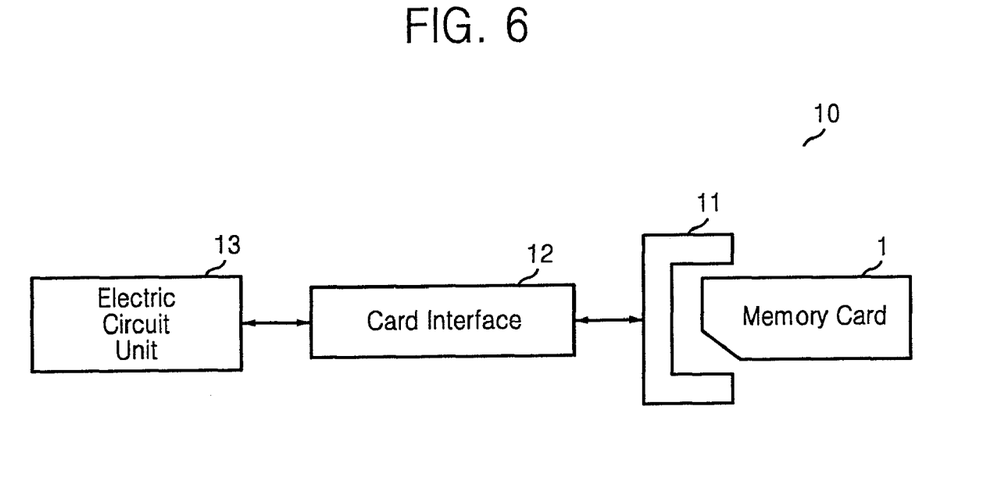
FIG. 6 is a block diagram showing the function of an electronic system having a nonvolatile memory according to an exemplary embodiment of the present invention.

FIG. 6 is a block diagram showing the function of an electronic system having a nonvolatile memory according to an exemplary embodiment of the present invention. FIGS. 7A through 7J illustrate electronic systems having a nonvolatile memory system according to an exemplary embodiment of the present invention. Referring to FIGS. 6 through 7J, the nonvolatile memory system 1 according to an exemplary embodiment of the present embodiment can be embodied by a memory card. The memory card can be used for an electronic system 10 of FIG. 6, such as a video camera of FIG. 7A, a television of FIG. 7B, an MP3 player of FIG. 7C, a game console of FIG. 7D, an electronic musical instrument of FIG. 7E, a portable terminal of FIG. 7F, a PC (personal computer) of FIG. 7G, a PDA (personal digital assistant) of FIG. 7H, a voice recorder of FIG. 7I, and a PC card of FIG. 7J.

Figure 7A:
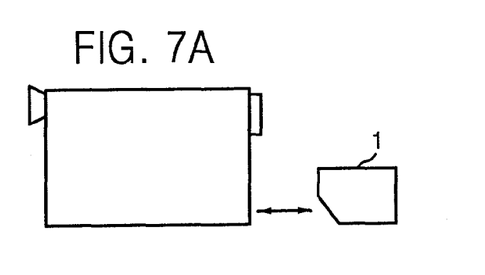
FIGS. 7A through 7J illustrate electronic systems having a nonvolatile memory system according to an exemplary embodiment of the present invention.
Figure 7B:
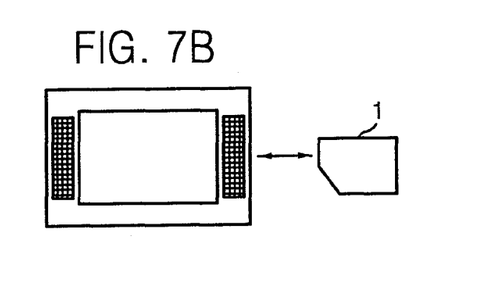
Figure 7C:
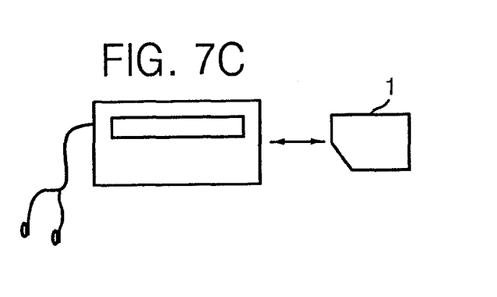
Figure 7D:
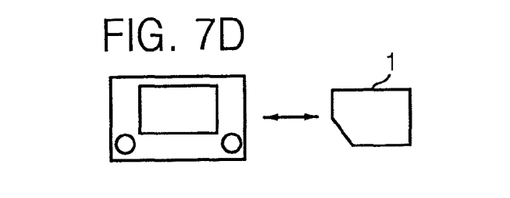
Figure 7E:
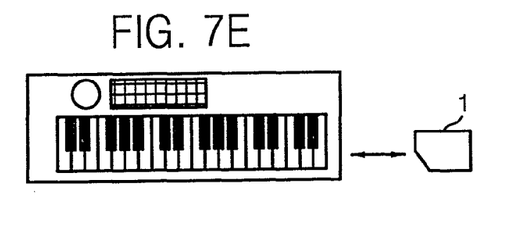
Figure 7F:
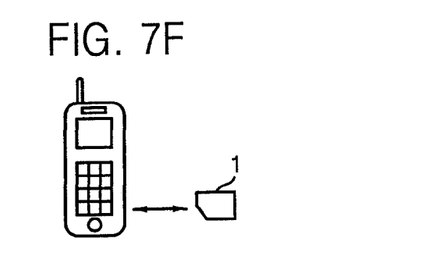
Figure 7G:
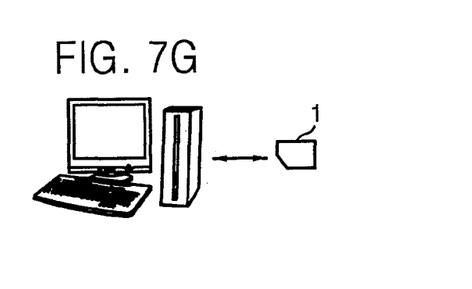
Figure 7H:
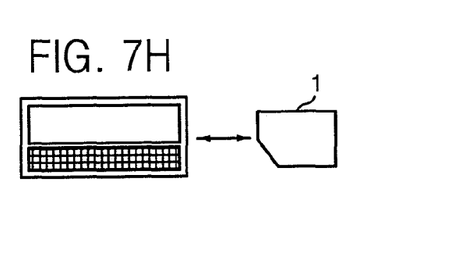
Figure 7I:
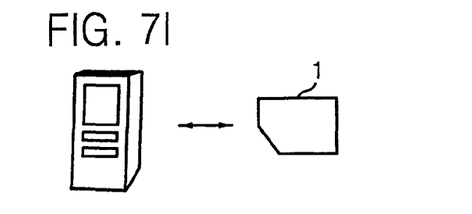
Figure 7J:
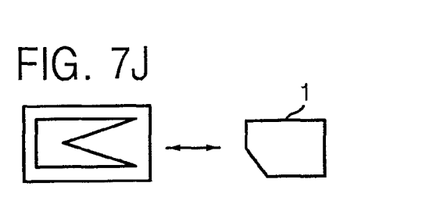

When each of the video camera of FIG. 7A, the television of FIG. 7B, the MP3 player of FIG. 7C, the game console of FIG. 7D, the electronic musical instrument of FIG. 7E, the portable terminal of FIG. 7F, the PC (personal computer) of FIG. 7G, the PDA (personal digital assistant) of FIG. 7H, the voice recorder of FIG. 7I, and the PC card of FIG. 7J has an interface 12 and a slot 11 connected to the interface 12, as shown in FIG. 6, the nonvolatile memory system 1 is connected to the slot 11 and exchanges a predetermined data and command with a CPU or a microprocessor of the electronic circuit 13 of each of the video camera of FIG. 7A, the television of FIG. 7B, the MP3 player of FIG. 7C, the game console of FIG. 7D, the electronic musical instrument of FIG. 7E, the portable terminal of FIG. 7F, the PC (personal computer) of FIG. 7G, the PDA (personal digital assistant) of FIG. 7H, the voice recorder of FIG. 7I, and the PC card of FIG. 7J.

Figure 4:
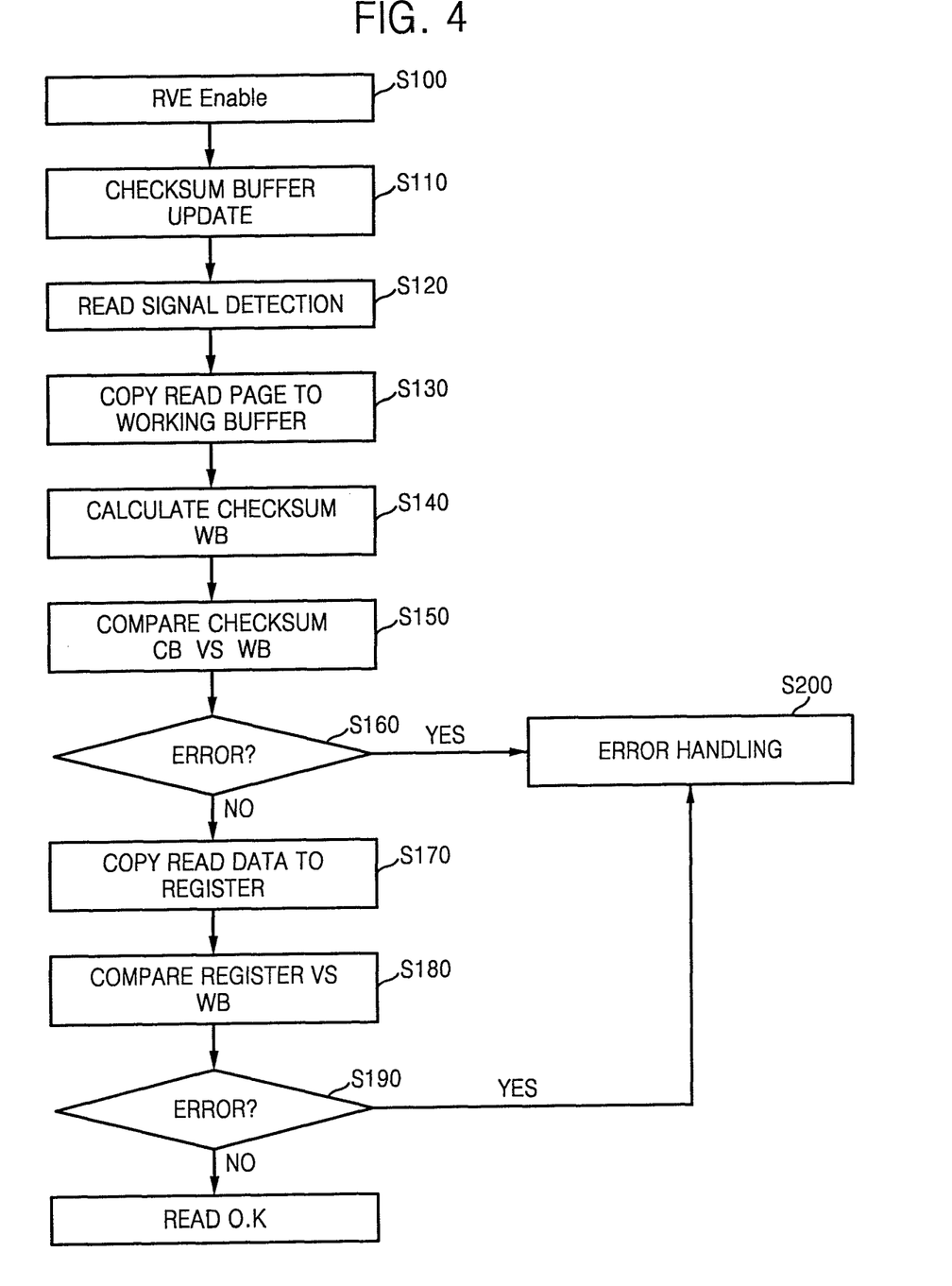
FIG. 4 is a flowchart for explaining a security method for a nonvolatile memory according to an exemplary embodiment of the present invention.

FIG. 4 is a flowchart for explaining a security method of a nonvolatile memory according to an exemplary embodiment of the present invention. Referring to FIGS. 1 and 4, a security method of a nonvolatile memory includes storing a unit, for example, a page, of the nonvolatile memory 150 corresponding to the RS that is externally input, for example, from the controller 300, in the working buffer 130 (S120, S130), calculating the checksum of the unit stored in the working buffer 130 (S140), and comparing the calculated checksum with the checksum of the unit corresponding to the RS stored in the checksum buffer 120 (S150).

Also, the nonvolatile memory security method may further include outputting an EHS (S200) when the calculated checksum is different from the checksum of the unit corresponding to the RS stored in the checksum buffer 120 (S160). To store the checksum of at least one unit of the nonvolatile memory 150 in the checksum buffer 120 at least once, the nonvolatile memory security method may further include calculating the checksum of at least one unit of the nonvolatile memory and storing the calculated checksum in the checksum buffer 120 (S110), before the step (S160) in which the calculated checksum is compared with the checksum of the unit corresponding to the RS stored in the checksum buffer 120.

When the nonvolatile memory security apparatus 100 is embodied so as to be selectively activated or inactivated, the nonvolatile memory security method may further include activating the nonvolatile memory security apparatus 100 (S100). Also, when the calculated checksum is the same as the checksum of the unit corresponding to the RS stored in the checksum buffer 120 as determined in the error checking step S160, the nonvolatile memory security method may further include transmitting the data corresponding to the RS stored in the working buffer 130 to the register 160 (S170) and comparing the data stored in the register 160 with the data corresponding to the RS stored in the working buffer 130 (S180).

The step S200 for outputting the EHS may include outputting an EHS based on the error handling bit information of the control register 140 when the calculated checksum is different from the checksum of a unit corresponding to the RS stored in the checksum buffer 120.

Figure 5:
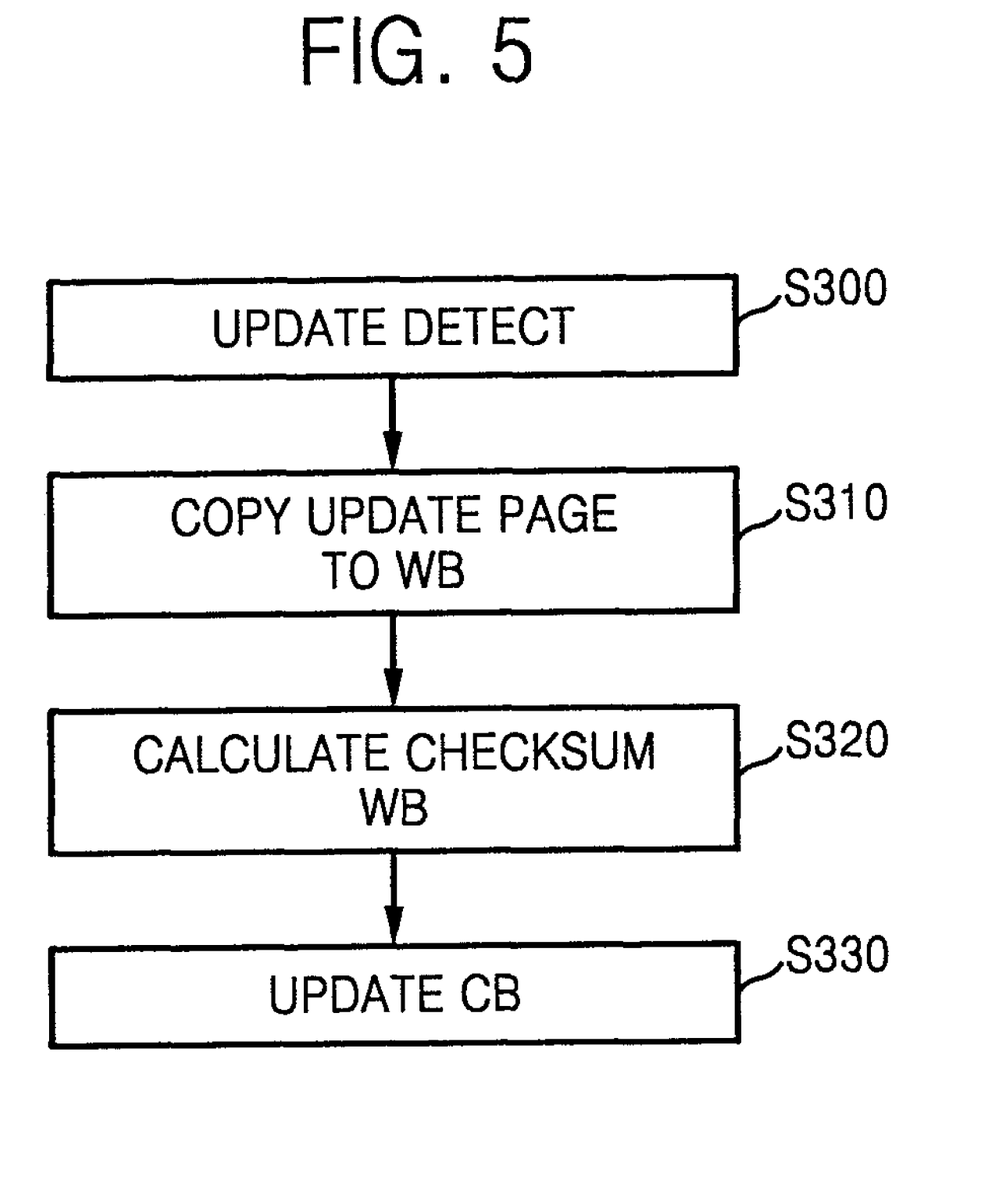
FIG. 5 is a flowchart for explaining a security method for a nonvolatile memory according to an exemplary embodiment of the present invention when the nonvolatile memory is updated.

FIG. 5 is a flowchart for explaining the nonvolatile memory security method according to an exemplary embodiment of the present invention when the nonvolatile memory is updated, Referring to FIGS. 1 and 5, the nonvolatile memory security method may further include responding to an hvas that is externally input, for example, from the controller 300, (S300), transmitting the unit of the nonvolatile memory 150 to the working buffer 130 (S310), calculating the checksum of the unit transmitted to the working buffer 130 (S320), and storing the calculated checksum in the checksum buffer 120 (S330).

As described above, the nonvolatile memory security apparatus and method according to exemplary embodiments of the present invention prevent the deterioration of the performance according to the conventional software protection method and realize an automatic protection mechanism in hardware, so that the security performance of a system or a chip and the overall performance of the system are improved.

While this invention has been particularly shown and described with reference to exemplary embodiments thereof, it will be understood by those of ordinary skill in the art that various changes in form and details may be made therein without departing from the spirit and scope of the invention, as defined by the appended claims.

What is claimed is:

1. A security apparatus for a nonvolatile memory, the security apparatus comprising:
   a nonvolatile memory;
   a working buffer that temporarily stores a unit output from the nonvolatile memory corresponding to a read signal that is externally input;
   a checksum buffer that stores a checksum of at least one unit output from the nonvolatile memory; and
   a read verification engine that controls the storing in the working buffer of the unit output from the nonvolatile memory,
   wherein the read verification engine calculates a checksum of the unit stored in the working buffer corresponding to the read signal and compares the calculated checksum with a checksum stored in the checksum buffer of the unit corresponding to the read signal.

2. The security apparatus of claim 1, wherein the checksum comprises at least one of CRC (cyclic redundancy checking) data and parity data.

3. The security apparatus of claim 1, wherein at least one of the working buffer or the checksum buffer comprises at least one of an SRAM (static random access memory) and a nonvolatile memory.

4. The security apparatus of claim 1, wherein the unit is a page.

5. The security apparatus of claim 1, wherein the read verification engine outputs an error handling signal when the calculated checksum is different from the checksum stored in the checksum buffer of the unit corresponding to the read signal.

6. The security apparatus of claim 5, wherein the error handling signal comprises at least one of an exception generation signal and a reset signal.

7. The security apparatus of claim 1, further comprising a control register, wherein the control register comprises at least one of a read verification engine control bit, a checksum control bit, a monitor bit, and an error handling bit.

8. The security apparatus of claim 7, wherein the read verification engine outputs an error handling signal based on information about the error handling bit of the control register when the calculated checksum is different from the checksum stored in the checksum buffer of the unit corresponding to the read signal.

9. The security apparatus of claim 1, further comprising a register, wherein the read verification engine calculates the checksum of the unit stored in the working buffer corresponding to the read signal and outputs data corresponding to the read signal to the register when the calculated checksum is the same as the checksum stored in the checksum buffer of the unit corresponding to the read signal.

10. The security apparatus of claim 9, wherein the read verification engine further compares data stored in the register with data stored in the working buffer corresponding to the read signal.

11. The security apparatus of claim 1, wherein, in response to a high voltage activation signal that is externally input, the read verification engine transmits to the working buffer a unit output from the nonvolatile memory corresponding to the high voltage activation signal, calculates a checksum of the unit transmitted to the working buffer, and stores a calculated checksum in the checksum buffer.

12. A nonvolatile memory system comprising:
   a controller; and
   a security apparatus for a nonvolatile memory,
   wherein, the security apparatus further comprises a checksum buffer, and
   wherein, in response to a read signal output from the controller, the security apparatus controls storing in a working buffer a unit output from a nonvolatile memory corresponding to the read signal, calculates a checksum of the unit stored in the working buffer corresponding to the read signal, and compares the calculated checksum with a checksum stored in the checksum buffer of the unit corresponding to the read signal.

13. The nonvolatile memory system of claim 12, further comprising one of a smart card and a memory card.

14. A security method for a nonvolatile memory, the security method comprising:
   storing in a working buffer a unit corresponding to a read signal that is externally input and output from a nonvolatile memory;
   calculating a checksum of the unit stored in the working buffer; and
   comparing the calculated checksum with a checksum stored in a checksum buffer of the unit corresponding to the read signal.

15. The security method of claim 14, further comprising outputting an error handling signal when the calculated checksum is different from the checksum stored in the checksum buffer of the unit corresponding to the read signal.

16. The security method of claim 15, wherein, in the outputting of the error handling signal, an error handling signal is output based on information about an error handling bit of a control register when the calculated checksum is different from the checksum stored in the checksum buffer of the unit corresponding to the read signal.

17. The security method of claim 14, further comprising:
calculating checksums of all units of the nonvolatile memory; and
storing the calculated checksums in the checksum buffer, before the comparing of the calculated checksum with the checksum stored in the checksum buffer of the unit corresponding to the read signal.

18. The security method of claim 14, further comprising:
transmitting to a register data stored in the working buffer corresponding to the read signal; and
comparing the data stored in the register with data stored in the working buffer corresponding to the read signal, when the calculated checksum is the same as the checksum stored in the checksum buffer of the unit corresponding to the read signal.

19. The security method of claim 14, further comprising:
in response to a high voltage activation signal that is externally input, transmitting a unit output from the nonvolatile memory and corresponding to the high voltage activation signal to the working buffer;
calculating a checksum of the unit transmitted to the working buffer; and
storing the calculated checksum in the checksum buffer.

* * * * *